United States Patent
Cleveland et al.

(10) Patent No.: US 7,813,315 B2
(45) Date of Patent: Oct. 12, 2010

(54) SPECTRUM SHARING IN A WIRELESS COMMUNICATION NETWORK

(75) Inventors: Joseph R. Cleveland, Murphy, TX (US); Farooq Khan, Allen, TX (US); Eran Pisek, Plano, TX (US); William J. Semper, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 652 days.

(21) Appl. No.: 11/702,397

(22) Filed: Feb. 5, 2007

(65) Prior Publication Data

US 2008/0112359 A1 May 15, 2008

Related U.S. Application Data

(60) Provisional application No. 60/858,644, filed on Nov. 13, 2006.

(51) Int. Cl.
*H04W 4/00* (2009.01)
(52) U.S. Cl. .................... 370/328; 370/208; 370/210
(58) Field of Classification Search .................... None
See application file for complete search history.

(56) References Cited

U.S. PATENT DOCUMENTS

| | | | |
|---|---|---|---|
| 7,236,554 B2* | 6/2007 | Gupta | 375/355 |
| 7,526,248 B2* | 4/2009 | Gould et al. | 455/11.1 |
| 2006/0223460 A1* | 10/2006 | Himayat et al. | 455/101 |
| 2006/0233270 A1* | 10/2006 | Ahn et al. | 375/260 |
| 2007/0109973 A1* | 5/2007 | Trachewsky | 370/252 |
| 2007/0140106 A1* | 6/2007 | Tsai et al. | 370/208 |
| 2008/0025330 A1* | 1/2008 | Wang | 370/406 |
| 2008/0049709 A1* | 2/2008 | Pan et al. | 370/344 |
| 2008/0056200 A1* | 3/2008 | Johnson | 370/333 |
| 2008/0080432 A1* | 4/2008 | Lu et al. | 370/335 |
| 2008/0089223 A1* | 4/2008 | Wu et al. | 370/209 |
| 2008/0089282 A1* | 4/2008 | Malladi et al. | 370/329 |
| 2008/0101440 A1* | 5/2008 | Lee | 375/141 |
| 2008/0112308 A1* | 5/2008 | Cleveland | 370/204 |
| 2010/0097997 A1* | 4/2010 | Sandhu | 370/328 |

* cited by examiner

*Primary Examiner*—Phirin Sam (57) ABSTRACT

A system and method for synchronous spectrum sharing for use in a wireless communication system based on orthogonal frequency-division multiplexing (OFDM) or orthogonal frequency division multiple access (OFDMA) signaling is disclosed. The system includes a frame detector configured to detect a frame of a broadcast waveform and extract sub-carrier information from a subframe or Secondary User Map (SU MAP). SU MAP includes information on usable sub-carrier and pilot sub-carriers for secondary users. The system allows transmitting data from the secondary user node in unused sub-carriers thereby making efficient use of unused or idle spectrum. Accordingly, secondary users of wireless communication systems can dynamically form ad-hoc mesh network communications in fixed or mobile scenarios.

23 Claims, 10 Drawing Sheets

SPECTRUM SHARING IN A WIRELESS COMMUNICATION NETWORK

CROSS-REFERENCE TO RELATED APPLICATION(S) AND CLAIM OF PRIORITY

The present application is related to U.S. Provisional Patent No. 60/858,644, filed Nov. 13, 2006, entitled "Method And Procedure For Spectrum Sharing In A WiMAX Network". U.S. Provisional Patent No. 60/858,644 is assigned to the assignee of the present application and is hereby incorporated by reference into the present application as if fully set forth herein. The present application hereby claims priority under 35 U.S.C. §119(e) to U.S. Provisional Patent No. 60/858,644.

TECHNICAL FIELD OF THE INVENTION

The present disclosure relates generally to communication networks and, in particular, to systems for spectrum sharing in wireless communication systems.

BACKGROUND OF THE INVENTION

Conventional fixed spectrum allocation schemes lead to significant spectrum under-utilization. For instance, experiments have indicated that as much as 62% of the spectrum below the 3 GHz band is idle even in the most crowded areas (e.g., near downtown Washington D.C. where both government and commercial spectrum usage is intensive). Such under-utilization and increasing demand for the radio spectrum suggest that a more effective spectrum allocation and utilization policy is necessary.

Currently, secondary users may use the licensed spectrum only when such use does not interfere with a primary user's communication. Such requirements imply that the use of the spectrum varies with time (i.e., dynamically changes), and is dependent on the load imposed by the primary users. Several conventional systems use multiple channels in wireless networks. However, such systems fail in dynamic spectrum access networks. For example, conventional systems assume that the set of available channels is static (i.e., the channels available for use are fixed at the time of network initiation). In multiple access wireless networks, however, such as Worldwide Interoperability for Microwave Access (WiMAX) with orthogonal frequency division multiple access (OFDMA) signaling, specified in IEEE-802.16e (2004) and IEEE-802.16 (2005), the set of available channels dynamically changes. Dynamic spectrum access networks operate in a multi-hop fashion and typically within an IEEE-802.16 or WiMAX network. Thus, conventional spectrum sharing systems and methods fail to address inter-operation with, for example, WiMAX waveforms.

There is therefore a need for spectrum sharing systems for use in dynamic spectrum sharing networks such as, for example, WiMAX networks.

SUMMARY OF THE INVENTION

The present disclosure provides systems and methods for spectrum sharing in wireless communication systems.

In one embodiment, the present disclosure provides a spectrum sharing system for use in a wireless communication system. The wireless communication system includes a primary user node and a secondary user node. The system includes a frame detector configured to detect a frame of a broadcast waveform and to extract subframe information identifying usable sub-carriers for the frame to the secondary user node. The secondary user node transmits data in a first one of usable sub-carriers identified in the subframe information.

In another embodiment, the present disclosure provides a method of spectrum sharing for use in a wireless communication network having a primary user node and a secondary user node. The method includes detecting a frame of a broadcast waveform and extracting subframe information identifying usable sub-carriers for the frame to the secondary user node. The method also includes transmitting data from the secondary user node in a first sub-carrier identified in the subframe information.

In still another embodiment, the present disclosure provides an apparatus for forming an ad hoc mesh network, for use in a wireless communication system. The apparatus includes a secondary user node having a node modem. The apparatus also includes a frame detector configured to detect a frame of a broadcast waveform and extract subframe information for the frame to the secondary user node. The secondary user node transmits data in a first unused sub-carrier identified in the subframe information.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Figure 1:
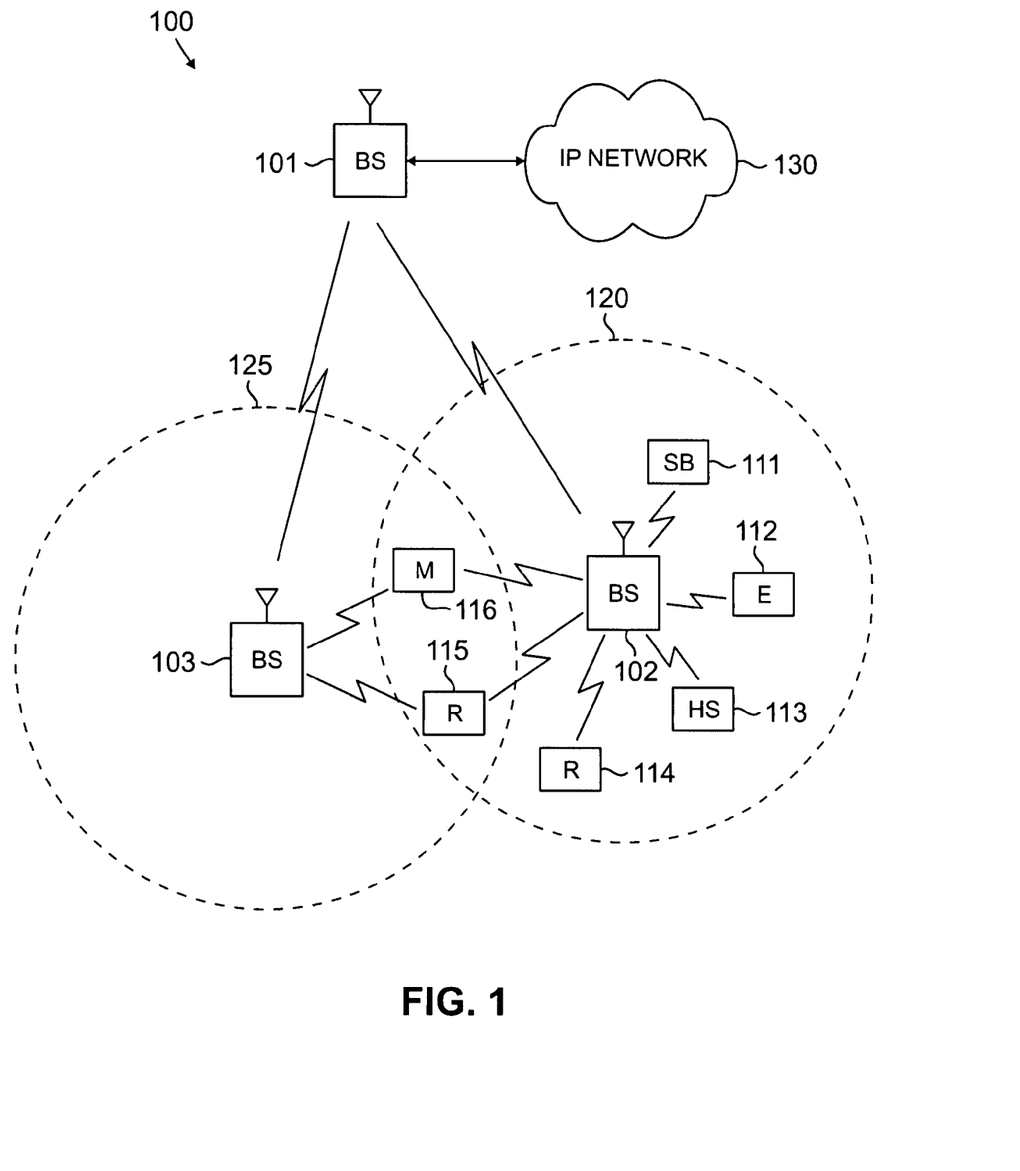
FIG. 1 is an exemplary wireless network suitable for spectrum sharing according to one embodiment of the present disclosure.

FIG. 1 illustrates an exemplary wireless network 100 suitable for synchronous spectrum sharing according to one embodiment of the present disclosure. In the illustrated embodiment, wireless network 100 includes base station (BS) 101, base station (BS) 102, and base station (BS) 103. Base station 101 communicates with base station 102 and base station 103. Base station 101 also communicates with Internet protocol (IP) network 130, such as the Internet, a proprietary IP network, or other data network.

Base station 102 provides wireless broadband access to network 130, via base station 101, to a first plurality of subscriber stations within coverage area 120 of base station 102. The first plurality of subscriber stations includes subscriber station (SS) 111, subscriber station (SS) 112, subscriber station (SS) 113, subscriber station (SS) 114, subscriber station (SS) 115 and subscriber station (SS) 116. In an exemplary embodiment, SS 111 may be located in a small business (SB), SS 112 may be located in an enterprise (E), SS 113 may be located in a WiFi hotspot (HS), SS 114 may be located in a first residence, SS 115 may be located in a second residence, and SS 116 may be a mobile (M) device.

Base station 103 provides wireless broadband access to network 130, via base station 101, to a second plurality of subscriber stations within coverage area 125 of base station 103. The second plurality of subscriber stations includes subscriber station 115 and subscriber station 116. In alternate embodiments, base stations 102 and 103 may be connected directly to the Internet by means of a wired broadband connection, such as an optical fiber, DSL, cable or T1/E1 line, rather than indirectly through base station 101.

In other embodiments, base station 101 may be in communication with either fewer or more base stations. Furthermore, while only six subscriber stations are shown in FIG. 1, it is understood that wireless network 100 may provide wireless broadband access to more than six subscriber stations. It is noted that subscriber station 115 and subscriber station 116 are on the edge of both coverage area 120 and coverage area 125. Subscriber station 115 and subscriber station 116 each communicate with both base station 102 and base station 103 and may be said to be operating in handoff mode, as known to those of skill in the art.

In an exemplary embodiment, base stations 101-103 may communicate with each other and with subscriber stations 111-116 using an IEEE-802.16 wireless metropolitan area network standard, such as, for example, an IEEE-802.16e standard. In another embodiment, however, a different wireless protocol may be employed, such as, for example, a HIPERMAN wireless metropolitan area network standard. Base station 101 may communicate through direct line-of-sight or non-line-of-sight with base station 102 and base station 103, depending on the technology used for the wireless backhaul. Base station 102 and base station 103 may each communicate through non-line-of-sight with subscriber stations 111-116 using OFDM and/or OFDMA techniques.

Base station 102 may provide a T1 level service to subscriber station 112 associated with the enterprise and a fractional T1 level service to subscriber station 111 associated with the small business. Base station 102 may provide wireless backhaul for subscriber station 113 associated with the WiFi hotspot, which may be located in an airport, café, hotel, or college campus. Base station 102 may provide digital subscriber line (DSL) level service to subscriber stations 114, 115 and 116.

Subscriber stations 111-116 may use the broadband access to network 130 to access voice, data, video, video teleconferencing, and/or other broadband services. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer, a laptop computer, a gateway, or another device.

Dotted lines show the approximate extents of coverage areas 120 and 125, which are shown as approximately circular for the purposes of illustration and explanation only. It should be clearly understood that the coverage areas associated with base stations, for example, coverage areas 120 and 125, may have other shapes, including irregular shapes, depending upon the configuration of the base stations and variations in the radio environment associated with natural and man-made obstructions.

Also, the coverage areas associated with base stations are not constant over time and may be dynamic (expanding or contracting or changing shape) based on changing transmission power levels of the base station and/or the subscriber stations, weather conditions, and other factors. In an embodiment, the radius of the coverage areas of the base stations, for example, coverage areas 120 and 125 of base stations 102 and 103, may extend in the range from less than 2 kilometers to about fifty kilometers from the base stations.

As is well known in the art, a base station, such as base station 101, 102, or 103, may employ directional antennas to support a plurality of sectors within the coverage area. In FIG. 1, base stations 102 and 103 are depicted approximately in the center of coverage areas 120 and 125, respectively. In other embodiments, the use of directional antennas may locate the base station near the edge of the coverage area, for example, at the point of a cone-shaped or pear-shaped coverage area.

The connection to network 130 from base station 101 may comprise a broadband connection, for example, a fiber optic line, to servers located in a central office or another operating company point-of-presence. The servers may provide communication to an Internet gateway for internet protocol-based communications and to a public switched telephone network gateway for voice-based communications. In the case of voice-based communications in the form of voice-over-IP (VoIP), the traffic may be forwarded directly to the Internet gateway instead of the PSTN gateway. The servers, Internet gateway, and public switched telephone network gateway are not shown in FIG. 1. In another embodiment, the connection to network 130 may be provided by different network nodes and equipment.

Figure 2:
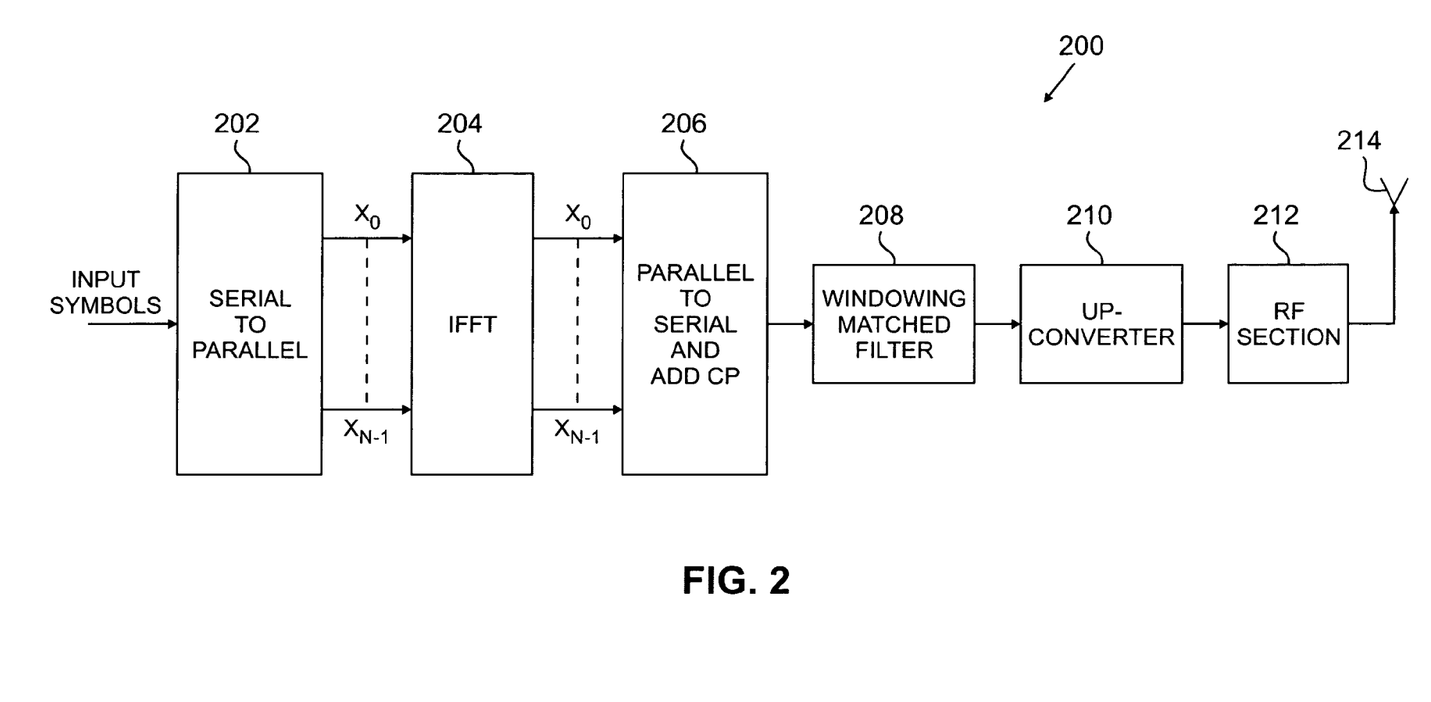
FIG. 2 is an exemplary block diagram of an orthogonal frequency-division multiplexing (OFDM) transmitter according to one embodiment of the present disclosure.

FIG. 2 is exemplary block diagram of a typical OFDM/OFDMA transmitter 200 according to one embodiment of the present disclosure. Transmitter 200 constructs, for example, an OFDM/OFDMA composite signal by first passing the serial output of a formatted, encoded, interleaved data signal through serial-to-parallel converter 202. Serial-to-parallel converter 202 separates each data signal into parallel data streams (e.g., $X_0 \ldots X_{N-1}$). A mapping function (MAP) within serial-to-parallel converter 202 maps each parallel data stream into I and Q modulation symbols, which are then applied to inverse fast Fourier transform (IFFT) block 204. The subcarrier separation is preferably an inverse of the OFDM symbol duration. IFFT block 204 computes the IFFT of each data stream and passes the output to parallel-to-serial and cyclic prefix (CP) block 206.

Parallel-to-serial and CP block 206 combines each parallel data stream into a data signal and introduces CP to aid in eliminating inter-symbol interference (ISI) and inter-block interference as later described in detail herein. For operation in time division duplex (TDD) mode, parallel-to-serial and CP block 206 inserts a guard interval (GI) into the signal. The output of parallel-to-serial and CP block 206 is passed to windowing matched filter 208 and then to up-converter block 210. The output of up-converter block 210 is then passed to RF section block 212 and transmitted via antenna 214. Accordingly, in the example shown in FIG. 2, user data signals may be represented by a set of 2N sub-carriers. In addition, pilot plus control signaling may be represented by a set of M separate sub-carriers. In one embodiment, N may be a power of 2 (e.g., $N=2^J$) and M may be a different power of 2 (e.g., $M=2^K$, where K<J)

Figure 3:
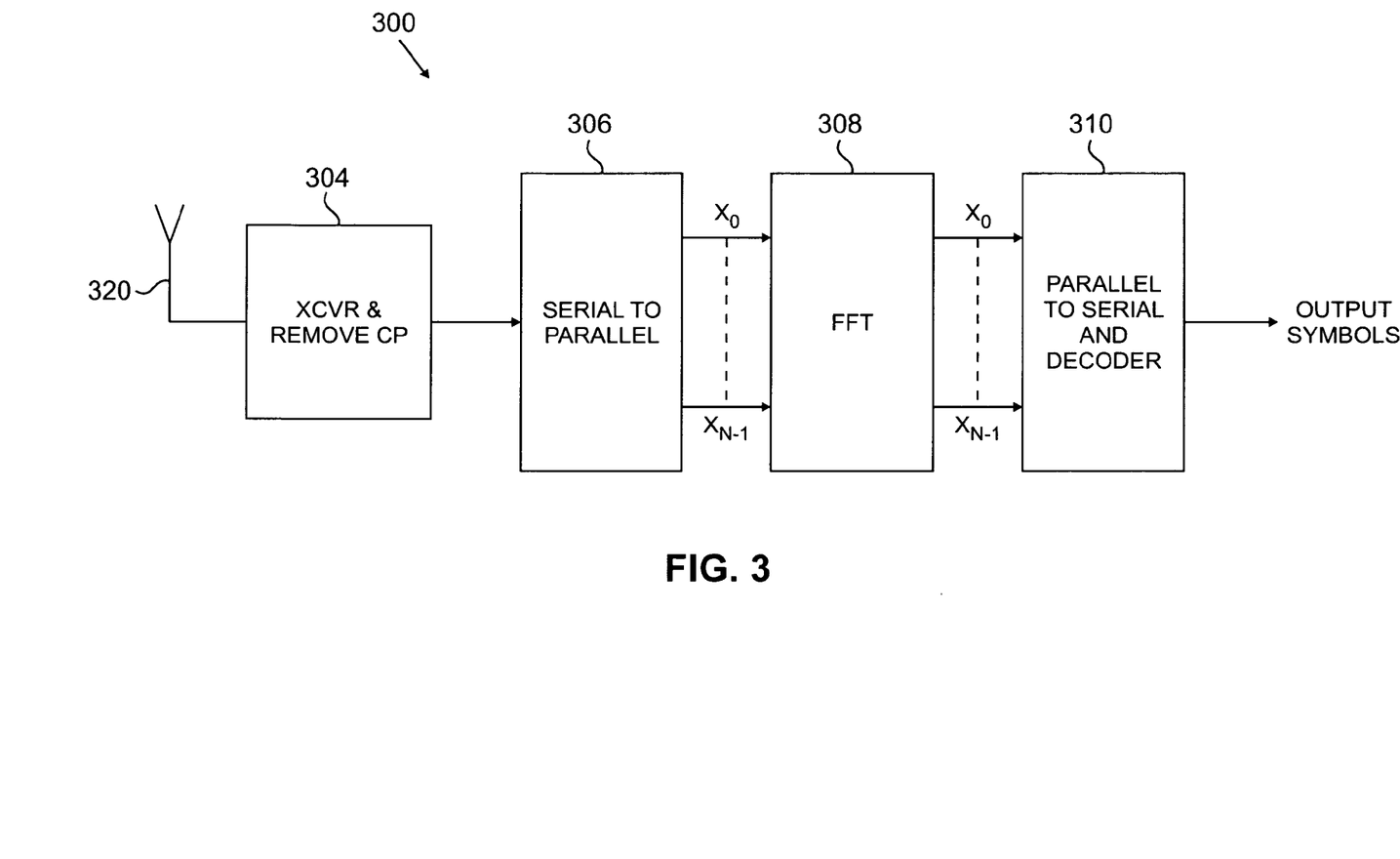
FIG. 3 is an exemplary block diagram of an OFDM receiver according to one embodiment of the present disclosure.

FIG. 3 is an exemplary block diagram of a typical OFDM/OFDMA receiver 300 according to one embodiment of the present disclosure. Receiver 300 detects the transmitted symbols and essentially reverses the process implemented by transmitter 200 described above. For example, the signal transmitted by antenna 214 is received by antenna 302. The signal is passed to transceiver and CP remove block 304. Transceiver and CP remove block 304 removes the CP from the signal and passes the signal to serial-to-parallel block 306. Serial-to-parallel block 306 separates the data signal into parallel data streams (e.g., $X_0 \ldots X_{N-1}$). A MAP within serial-to-parallel converter 201 maps each parallel data stream into I and Q modulation symbols, which are then passed to fast Fourier transform (FFT) block 308. The output of FFT block 308 is then passed to parallel-to-serial and decoder block 310 and then output as desired.

Figure 4:
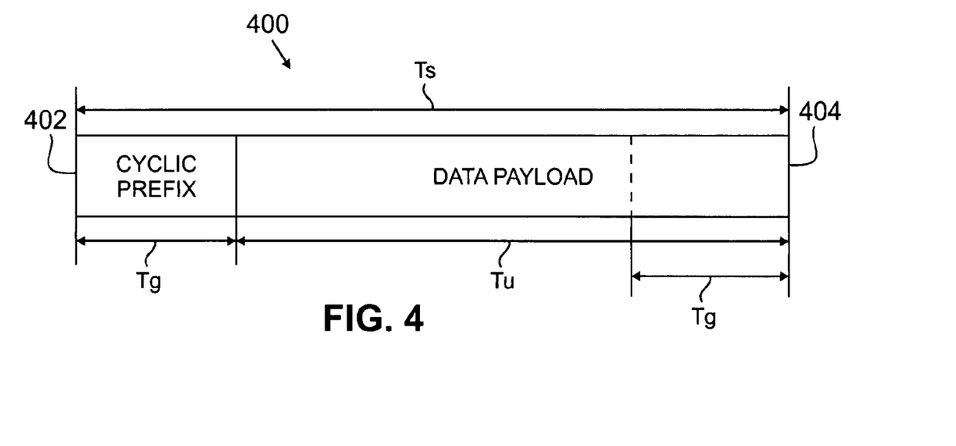
FIG. 4 depicts an exemplary OFDM symbol data payload inserted with a cyclic prefix (CP) for a given OFDM symbol period according to one embodiment of the present disclosure.

FIG. 4 illustrates OFDM symbol 400 in which CP 402 is inserted into data payload 404 according to one embodiment of the present disclosure where the total symbol period ($T_s$) is greater than the sum of the guard times ($T_g$) and the useful symbol period ($T_u$). OFDM waveforms provide increased symbol duration (i.e., $T_s$ and $T_u$) and thus improve the robustness of OFDM to delay spread. Accordingly, with the introduction of CP 402, ISI can be eliminated as long as the duration of CP 402 is longer than the channel delay spread. CP 402 is typically a repetition of the last samples of data portion of the block that is appended to the beginning of data payload 404 as shown in FIG. 4. CP 402 prevents inter-block interference and makes the channel appear circular. CP 402 therefore permits low-complexity frequency domain equalization. While CP 402 somewhat reduces bandwidth efficiency, the impact of CP 402 is similar to the "roll-off factor" in raised-cosine filtered single-carrier systems. Notably, OFDM has a very sharp, almost "brick-wall" spectrum. Thus, a large fraction of the allocated channel bandwidth may be utilized for data transmission and for moderating the loss in efficiency due to CP 402.

Similar attributes exist for OFDMA. The OFDMA symbol structure consists of three types of sub-carriers: (1) Data sub-carriers for data transmission; (2) Pilot sub-carriers for estimation and synchronization purposes; and (3) Null sub-carriers for no transmission (typically used for guard bands and DC carriers). The active sub-carriers (i.e., data and pilot sub-carriers) are generally grouped into subsets of sub-carriers called sub-channels.

Figure 5A:
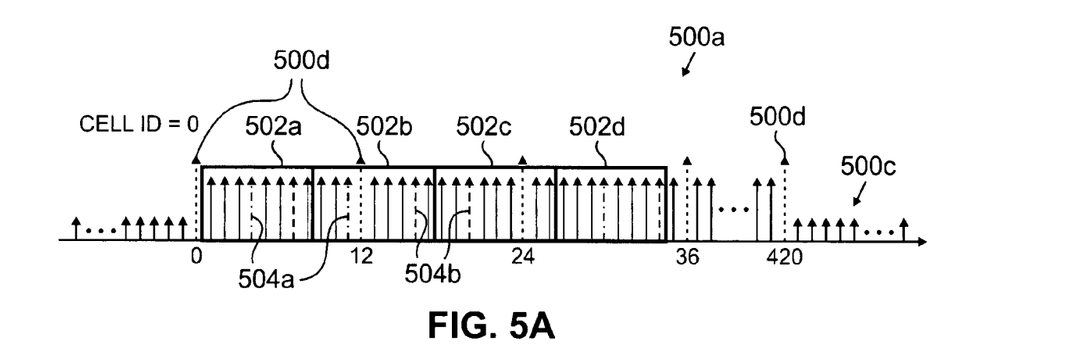
FIGS. 5A and 5B depict exemplary distributed sub-carrier allocations according to one embodiment of the present disclosure.
Figure 5B:
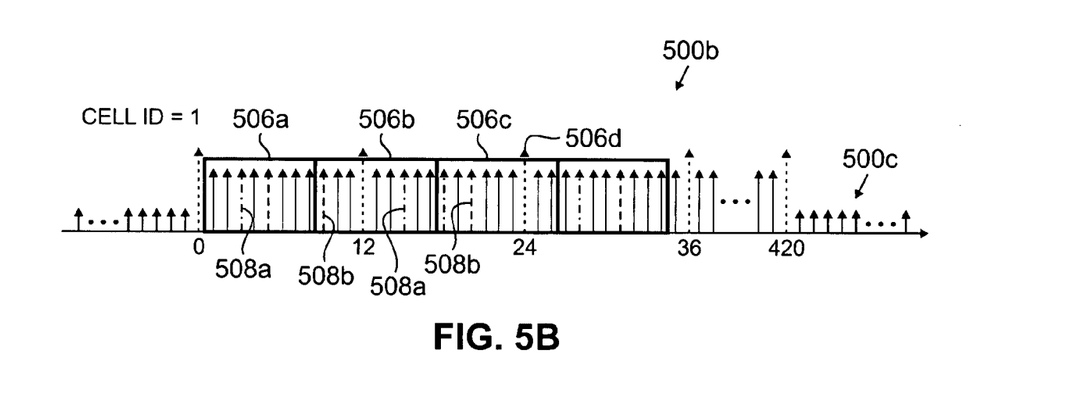

FIGS. 5A and 5B depict exemplary distributed sub-carrier allocations 500a and 500b (collectively referred to herein as distributed sub-carrier allocation 500) associated with a Fourier fast transform (FFT) bin number 500c according to one embodiment of the present disclosure. FIGS. 5A and 5B depict distributed sub-carrier allocations 500 in, for example, Cell ID 0 and Cell ID 1, respectively, and are referred to herein for illustration purposes only.

FIGS. 5A and 5B illustrate a sub-carrier allocation comprised of three types: (a) Data sub-carriers 504 and 508 for data transmission; (b) Pilot sub-carriers 500d for estimation and synchronization purposes; and (c) Null sub-carriers 500c used for guard bands and DC carriers. In one implementation, a fixed number of pilot sub-carriers 500d are evenly distributed among the active sub-carriers that comprise (a) and (b). As later described herein in more detail, a permutation process draws a sub-carrier pseudo-randomly from permutation groups 502 to form a sub-channel. This allocation of sub-carriers to sub-channels in a pseudorandom fashion is done so that there is a high probability that the sub-carriers for a given sub-channel in a certain cell are different than sub-carriers for that same sub-channel in another cell (for example the sub-carriers in sub-channel 1 in cell 1 will be different than the sub-carriers in sub-channel 1 in cell 2). This pseudorandom permutation provides an interference averaging effect further reducing the adverse effects of cell to cell interference.

FIG. 5A shows four groups of sub-carriers, groups 506a, 506b, 506c and 506d (collectively referred to herein as groups 506). Each of the sub-carriers depicted in groups 506 are associated with a specific sub-channel, sub-channels 508a and 508b (collectively referred to herein as sub-channels 508). Although only two sub-channels 508 are shown in FIG. 5B, it should be understood that any suitable number of sub-channels 508 may be apparent. Each of sub-channels 508 generally includes forty-eight (48) data sub-carriers.

Similarly, FIG. 5B illustrates four groups of sub-carriers, groups 506a, 506b, 506c and 506d (collectively referred to herein as permutation groups 506). Each of the sub-carriers depicted in groups 506 are associated with a specific sub-channel, sub-channels 508a and 508b (collectively referred to herein as sub-channels 508). Although only two sub-channels 508 are shown in FIG. 5B, it should be understood that any suitable number of sub-channels 508 may be apparent. Each of sub-channels 508 generally includes forty-eight (48) data sub-carriers.

The WiMAX OFDMA physical layer (PHY) generally supports sub-channelization in both the up-link (UL) and the down-link (DL). In certain standards such as, for example, IEEE-802.16-2004 and IEEE-802.16-2005, the minimum frequency-time resource unit of sub-channelization is one slot. One slot is typically equal to forty-eight (48) data tones or sub-carriers. The two types of sub-carrier permutations for sub-channelization are the diversity permutation and the contiguous permutation. The diversity permutation draws sub-carriers pseudo-randomly to form a sub-channel and provides frequency diversity and inter-cell interference averaging.

The diversity permutations include downlink (DL) FUSC (Fully Used Sub-Carrier), DL PUSC (Partially Used Sub-Carrier) and uplink (UL) PUSC and additional optional permutations. With DL PUSC, for each pair of OFDM symbols, the available or usable sub-carriers are grouped into clusters containing fourteen (14) contiguous sub-carriers per symbol, with pilot and data allocations in each cluster in the even and odd symbols.

A re-arranging scheme is used to form groups of clusters such that each one of the groups (e.g., groups 502 and 506) is made up of clusters that are distributed throughout the sub-carrier space (e.g., distributed sub-carrier allocation 500). A sub-channel (e.g., sub-channels 504 and 508) in a group (e.g., groups 502 and 506) contains two (2) clusters and is comprised of forty-eight (48) data sub-carriers and eight (8) pilot sub-carriers.

Analogous to the cluster structure for DL, a tile structure is defined for the UL PUSC. The available sub-carrier space (e.g., distributed sub-carrier allocation 500) is split into tiles and six (6) tiles, chosen from across the entire spectrum by means of a re-arranging/permutation scheme, are grouped together to form a slot. The slot is comprised of forty-eight (48) data sub-carriers and twenty-four (24) pilot sub-carriers in three (3) OFDM symbols.

The IEEE-802.16-2005 Wireless MAN OFDMA mode is based on the concept of scalable OFDMA (S-OFDMA). S-OFDMA supports a wide range of bandwidths to flexibly address the need for various spectrum allocation and usage model requirements. The scalability of the OFDMA system is accomplished by adjusting the FFT size while fixing the sub-carrier frequency spacing at 10.94 kHz. Since the resource unit sub-carrier bandwidth and symbol duration is fixed, the impact to higher layers is minimal when scaling the bandwidth. An exemplary set of embodiments for S-OFDMA parameters is listed in TABLE 1 below.

TABLE 1

SCALABLE OFDMA PARAMETERS OF WIMAX

| Parameters | Values | | | |
|---|---|---|---|---|
| System Channel Bandwidth (MHz) | 1.25 | 5 | 10 | 20 |
| Sampling Frequency ($F_p$ in MHz) | 1.4 | 5.6 | 11.2 | 22.4 |
| FFT Size ($N_{FFT}$) | 128 | 512 | 1024 | 2048 |
| Number of Sub-Channels | 2 | 8 | 16 | 32 |
| Sub-Carrier Frequency Spacing | 10.94 kHz | | | |
| Useful Symbol Time ($T_b = 1/f$) | 91.4 microseconds | | | |
| Guard Time ($T_g = T_b/8$) | 11.4 microseconds | | | |
| OFDMA Symbol Duration ($T_s = T_b + T_g$) | 102.9 microseconds | | | |

TABLE 1-continued

SCALABLE OFDMA PARAMETERS OF WIMAX

| Parameters | Values |
|---|---|
| Number of OFDMA Symbols (5 ms Frame) | 48 |

Figure 6A:
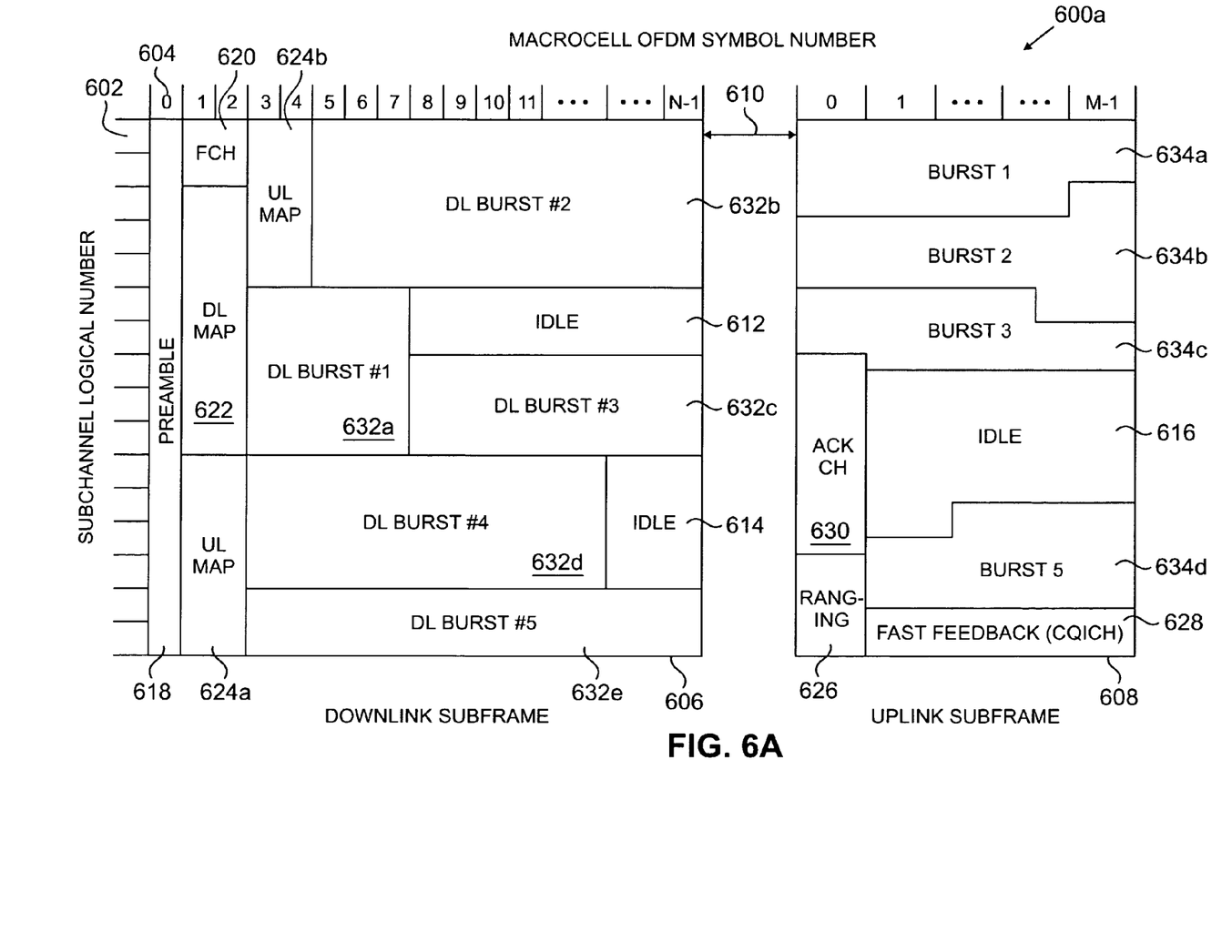
FIG. 6A is an exemplary OFDMA frame structure for a time division duplex (TDD) implementation according to one embodiment of the present disclosure.

FIG. 6A illustrates WiMAX OFDM/OFDMA broadcast frame 600a for TDD implementation according to one embodiment of the present disclosure. Broadcast frame 600a illustrates the relationship between a given sub-channel logical number 602 and a macrocell OFDM/OFDMA time slot or symbol number 604. Broadcast frame 600a is further divided into and supports sub-channelization in DL subframe 606 and UL subframe 608. DL sub-frame 606 and UL subframe 608 are separated by transmit/receive transition gaps (TTG) and receive/transmit transition gaps (RTG) (collectively referred to herein as transition gap 610). Transition gap 610 prevents DL and UL transmission collisions.

DL subframe 606 and UL subframe 608 include several unused or idle spectrum such as, for example, idle blocks 612, 614 and 616. Although a specified number of idle blocks is illustrated in DL subframe 606 and UL subframe 608, it should be understood that any number of idle blocks in fact be available in accordance with the present disclosure.

Control information for broadcast frame 600a is used to ensure optimal system operation. For example, control information may include preamble 618, frame control head (FCH) 620, DL-MAP 622, UL-MAPs 624a and 624b (collectively referred to herein as UL-MAP 624), UL ranging sub-channel 626, UL channel quality indicator channel (CQICH) 628 and UL acknowledge sub-channel (ACK) 630. Preamble 618 is used for synchronization is the first symbol number 604 of broadcast frame 600a. FCH 620 follows preamble 618 and provides frame configuration information such as MAP message length, coding scheme and usable sub-channels.

DL-MAP 622 and UL-MAP 624 provide sub-channel allocation and other control information for DL subframe 606 and UL subframe 608, respectively. UL ranging sub-channel 626 is allocated for mobile stations (MS) to perform closed-loop time, frequency, and power adjustment as well as bandwidth requests. UL CQICH 628 is allocated for the MS to feedback channel state information, while UL ACK 630 is allocated for the MS to feedback DL (hybrid automatic request) HARQ acknowledgement.

Finally, DL subframe 606 is shown with several DL data bursts 632a, 632b, 632c, 632d and 632e (collectively referred to as DL data bursts 632). It should be understood that any suitable number of DL data bursts 632 may be included in DL subframe 606. Similarly, UL subframe 608 is shown with several UL data bursts 634a, 634b, 634c and 634d) (collectively referred to herein as UL data bursts 634). It should be understood that any suitable number of UL data bursts 634 may be included in UL subframe 606.

In one embodiment, the present disclosure provides a system for secondary users to dynamically access available channels (e.g., in "white space") to broadcast IEEE-802.16 or WiMAX signals. The system provides such access to secondary users on a non-interfering or leasing basis. The term "secondary user" generally refers to a spectrum user who is not an owner of the spectrum but who operates in the spectrum based on agreements/etiquettes imposed by the primary users or regulatory entities.

The available spectrum and/or sub-carriers for use by the secondary users are time varying and location-dependent because of the traffic load and distribution of the primary users. Thus, in one embodiment, the present disclosure may use a formatted message in the downlink OFDMA frame that identifies spectrum available for use by the secondary users. In another embodiment, the present disclosure provides that the secondary users opportunistically form ad-hoc mesh network communications in fixed or mobile scenarios.

Figure 6B:
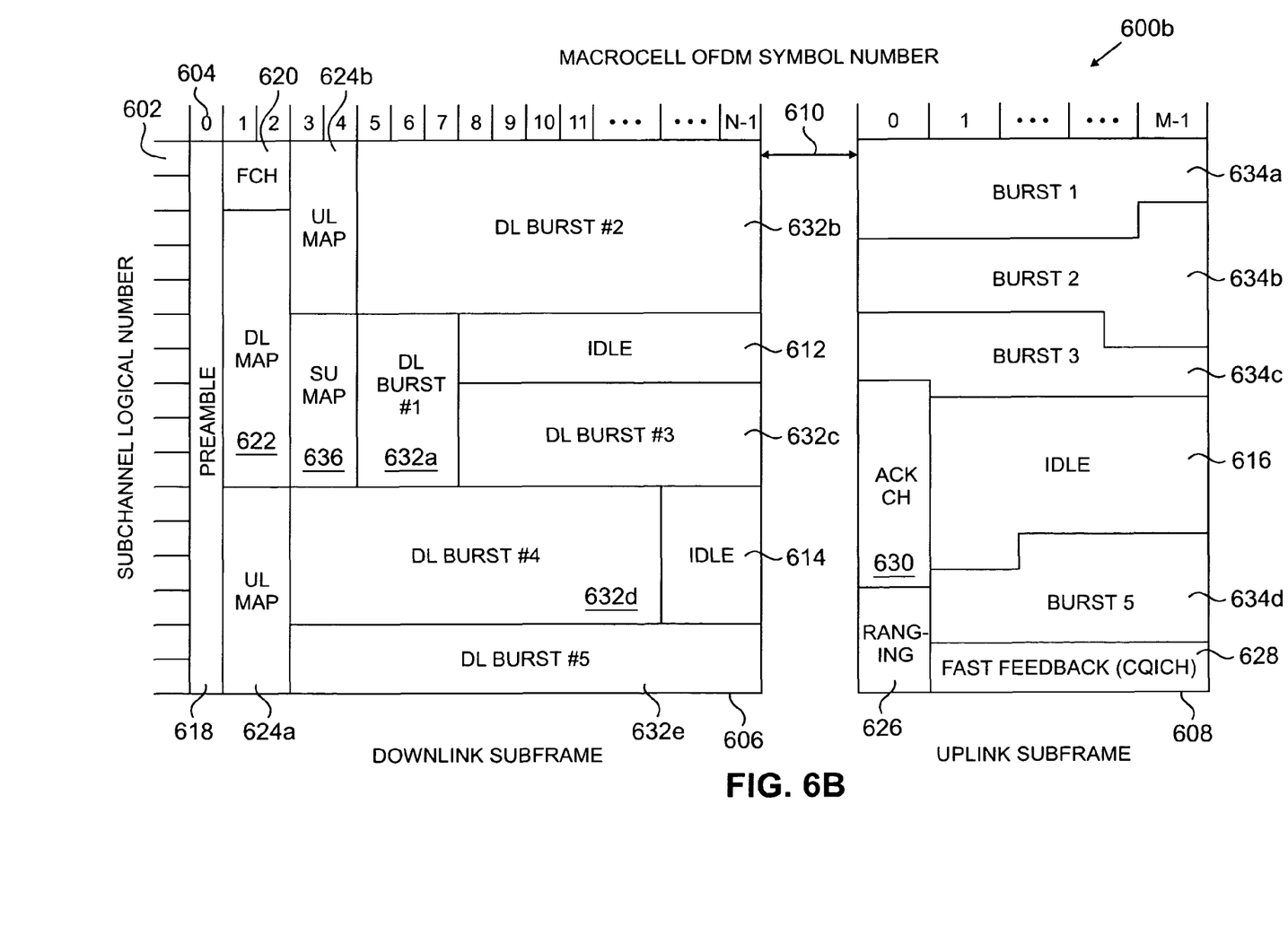
FIG. 6B is an exemplary OFDMA frame structure for a TDD implementation with the addition of a secondary user MAP (SU MAP) subframe according to one embodiment of the present disclosure.

FIG. 6B depicts an exemplary WiMAX OFDMA frame structure 600b according to one embodiment of the present disclosure. Frame structure 600b is similar to frame structure 600a described above. Frame structure 600b includes sub-frame or Secondary User Map (SU MAP) 636. SU MAP 636 identifies those sub-carriers that are usable by secondary users. TABLE 2 is an example frame format for SU MAP 636 according to embodiment of the present disclosure.

TABLE 2

EXAMPLE OF SU MAP FRAME FORMAT

| Syntax | Size | Notes |
| --- | --- | --- |
| SU_MAP( ) { | | |
| N_SLOTS | 8 bits | The number of idle slots available in the frame. |
| For (n=0;n<N_SLOTS;n++){ | | |
| PERM_Indicator | 1 bit | Indicates whether or not open slot 'n', as defined by the parameters below, is available in all future frames. |
| UL-DL Indicator | 1 bit | Indicates whether open slot 'n' is in the Up Link Frame ('0') or the Down Link Frame ('1'). |
| OFDMA Symbol Offset | 8 bits | The offset of the OFDMA symbol in which slot n starts, measured in OFDMA symbols from the beginning of frame in which open slot 'n' is included (either UL or DL, depending on the UL-DL Indicator). |
| Subchannel Offset | 6 bits | The lowest index OFDMA subchannel in open slot n, starting from subchannel '0' |
| No. OFDMA Symbols | 7 bits | The number of OFDMA symbols that make up open slot 'n'. |
| No. Channels | 6 bits | The number of subchannels, with subsequent indexes, that make up slot 'n' |

In one embodiment, SU MAP 636 identifies the groupings of sub-carriers into one or more SU sub-channels. The format of the SU sub-channel identifies the SU pilot sub-carriers used for channel estimation by the secondary user terminals. While FIG. 6B illustrates the location of the SU MAP 636 as adjacent to DL MAP 622 and UL MAP 624b, the location of SU MAP 636 within OFDMA frame structure 600b may be in any suitable location. Moreover, SU MAP 636 may be occupied by any suitable number of sub-channels and symbol periods. Preferably, the size of SU MAP 636 is known by the secondary user or users in one embodiment of the present disclosure.

Figure 7:
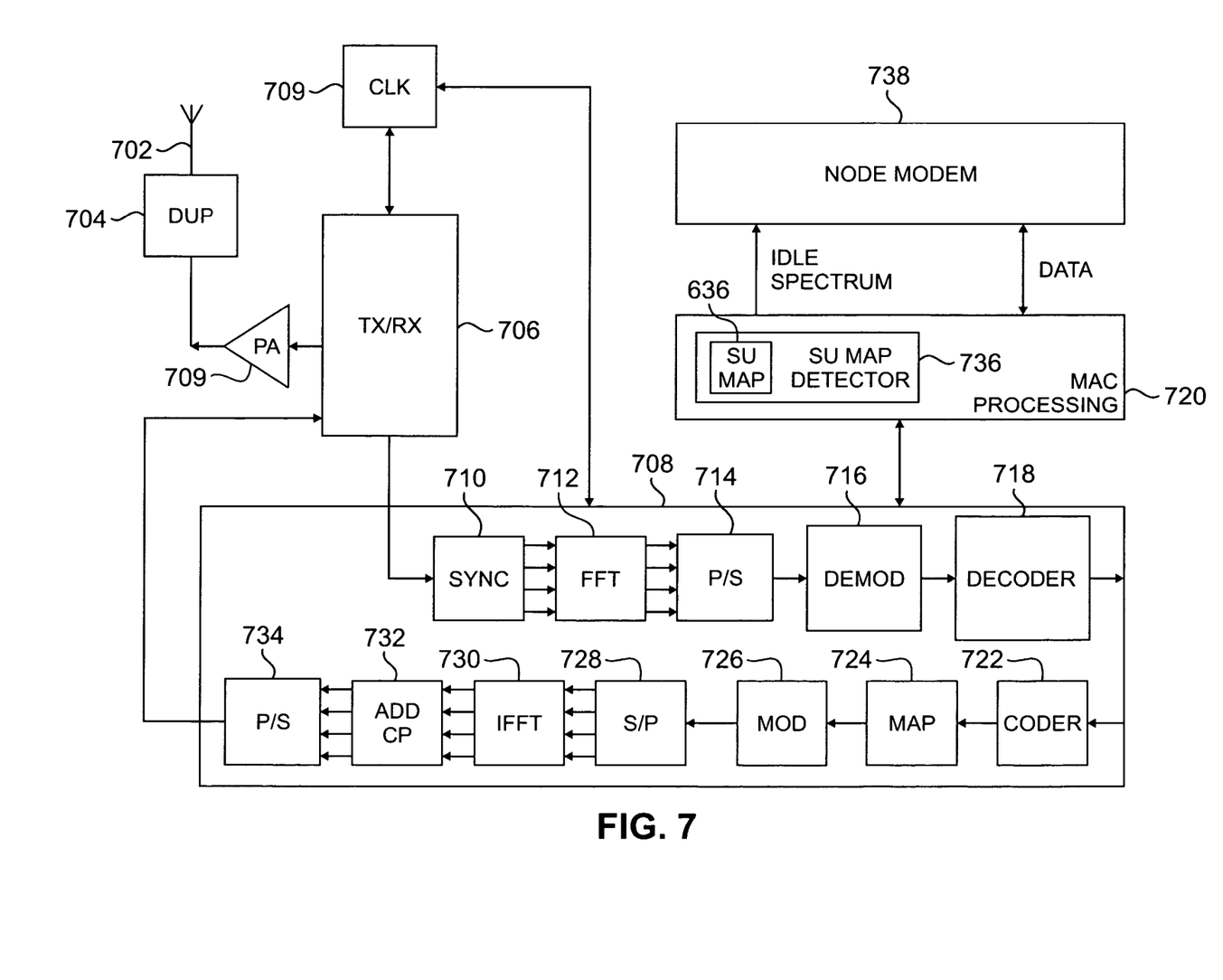
FIG. 7 is a simplified block diagram illustrating an exemplary system for the ad-hoc use of an OFDM/OFDMA spectrum by a secondary spectrum user according to one embodiment of the present disclosure.

FIG. 7 is a somewhat simplified block diagram illustrating system 700 for ad-hoc use of OFDM/OFDMA spectrum by a secondary user according to one embodiment of the present disclosure. System 700 includes an antenna 702 to receive and transmit signals. Antenna 702 is operably connected to a suitable duplexer 704.

When antenna 702 receives a signal, duplexer 704 passes the signal to transceiver 706. Transceiver 706 may be any suitable transceiver such as, for example, a radio frequency integrated circuit (RFIC) transceiver. Transceiver 706 removes the CP from the signal and passes the signal to processing block 708. Processing block 708 and transceiver 706 may be synchronized using clock/synchronizer module 709.

While in processing block 708, synchronizer 710 synchronizes and then separates the data signal into parallel data streams such as, for example, $X_0 \ldots X_{N-1}$. A MAP within synchronizer 710 maps each parallel data stream into I and Q modulation symbols, which are then passed to fast Fourier transform (FFT) block 712. The output of FFT block 712 is then passed to parallel-to-serial block 714. The output of parallel-to-serial block 714 is passed to demodulator 716 where the signal is demodulated and subsequently passed on to decoder block 718. The output of the decoder block is then passed to MAC processing block 720. It should be understood that processing block 708 may be any suitable signal processing circuit.

Similarly, before antenna 702 can transmit a signal from MAC processing block 720, the OFDM/OFDMA composite signal generally passes through processing block 708. The composite signal is coded in coding block 722 and mapped using mapping block 724. The output of mapping block 724 is modulated in modulation block 726 and then passed through serial-to-parallel converter 728. Accordingly, the OFDM/OFDMA composite signal is a formatted, encoded and interleaved data signal. Serial-to-parallel converter 728 separates each data signal into parallel data streams (e.g., $X_0 \ldots X_{N-1}$). A mapping function (MAP) within serial-to-parallel converter 728 maps each parallel data stream into I and Q modulation symbols, which are then applied to inverse fast Fourier transform (IFFT) block 730. The subcarrier separation is preferably an inverse of the symbol rate.

IFFT block 730 computes the IFFT of each data stream and passes the output to cyclic prefix (CP) block 732. CP block 732 introduces CP to aid in eliminating inter-symbol interference (ISI) and inter-block interference as described in detail herein. The parallel-to-serial block 734 combines each parallel data stream into a data signal and sums the multiple sub-carriers to the transmission frequency. For operation in time division duplex (TDD) mode, CP block 732 inserts a guard interval (GI) into the signal. The output of parallel-to-serial 736 is passed to windowing matched filter (not shown) and then to transceiver 706. The signal is passed to power amplifier 740, duplexer 704 before being transmitted by antenna 702.

Still referring to FIG. 7, suppose a secondary user or users detect a broadcast OFDMA waveform. The secondary user first synchronizes the waveform using, for example, synchronizer 710, to an OFDMA frame, such as OFDMA frame 600*b*. The secondary user accordingly extracts information from SU MAP 636 stored in, for example, SU MAP detector 736. The extracted information, which may include, for example, information on available spectrum and SU sub-channels, is sent to MAC processing block 720. MAC processing block 720 forwards the available spectrum and SU sub-channel information to the node controller or node modem 738. Node modem 738 may also include additional routing protocols. Node modem 738 may be any suitable node controller or modem including, for example, MANET node controllers.

At this point, if a secondary user has data to transmit, the secondary user transmits the data to a neighboring secondary node or nodes in the idle spectrum space as later described herein in conjunction with FIGS. 8A and 8B. For example, the SUM MAP detector 736 sends idle block information to node modem 738 in response to the secondary user's transmitting need. In one scenario, the secondary user or users may transmit a signal identical or substantially identical to the OFDMA signal used by the primary users. In another scenario, the secondary user uses a signal that does not exceed the spectrum allowed by idle sub-carriers. Transmission by the ad-hoc node within the UL idle spectrum may similarly be conducted. If a secondary user does not have data to transmit, the secondary user listens for data symbols transmitted by neighboring secondary nodes on idle sub-carriers during the idle symbol periods.

Figure 8A:
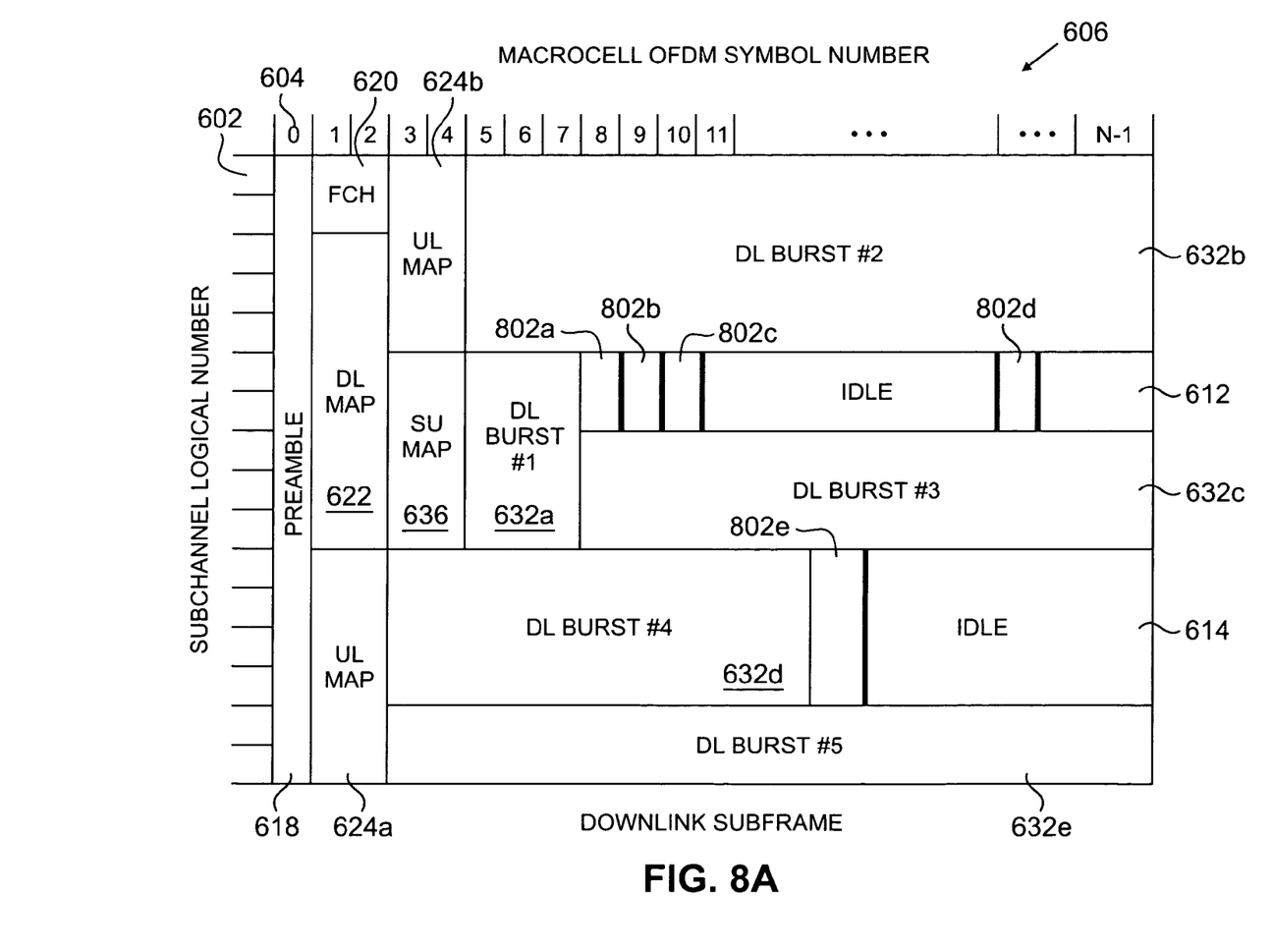
FIG. 8A is an exemplary OFDMA frame structure illustrating secondary node packet bursts occurring in unused OFDM symbol slots according to one embodiment of the present disclosure.

FIG. 8A is an expanded view of DL subframe 606 of broadcast frame 600*b* shown with secondary node data bursts 802*a*, 802*b*, 802*c*, 802*d* and 802*e* (collectively referred to herein as secondary node data bursts 802) according to one embodiment of the present disclosure. Secondary node data bursts 802 are located in unused symbol numbers 604. For example, secondary node data burst 802*a* occurs in idle block 612 and specifically within the "8th" symbol number 604.

Similarly, secondary node data burst 802*b* occurs in idle block 612 and specifically within the "9th" symbol number 604. Likewise, secondary node data burst 802*c* occurs in idle block 612 and specifically within the "10th" symbol number 604. Secondary node data burst 802*d* occurs in idle block 612 between the "11th" symbol number 604 and the "N−1" symbol number 604. As still another example, secondary node data burst 802*e* occurs in idle block 614 within some symbol number 604 between the "11th" symbol number 604 and the "N−1" symbol number 604.

Figure 8B:
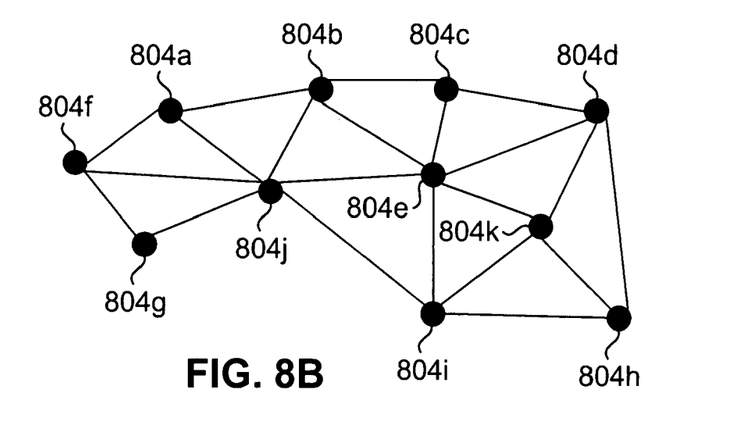
FIG. 8B is an exemplary cluster of secondary nodes according to one embodiment of the present disclosure which may provide the secondary node packet bursts depicted in FIG. 8A.

FIG. 8B illustrates an example cluster of secondary nodes 804*a*-804*k* (collectively referred to herein as secondary nodes 804). As one example, secondary node 804*a* may have transmitted secondary node data burst 802*a* in idle block 612, while secondary node 804*b* may have transmitted secondary node data burst 802*b* in idle block 612. At the same time, secondary node 804*c* may have transmitted secondary node data burst 802*c* in idle block 612 and secondary node 804*d* may have transmitted secondary node data burst 802*d* in idle block 612. Similarly, secondary node 804*e* may have transmitted secondary node data burst 802*e* in idle block 614. It should be understood that any suitable number and combinations of secondary nodes 804 may transmit data into idle block 612 and 614 at the same time.

Each one of secondary user nodes 804 uses an OFDM/OFDMA frame detector 402 to synchronize to broadcast frame 600, and to detect, for example, preamble 618, DL-MAP 622 and UL-MAP 624. Although there are a specific number of secondary user nodes 804 and secondary shown in FIG. 8B, any suitable number of secondary user nodes 804 and secondary node data bursts 802 may be used in accordance with the present disclosure.

DL-MAP 622 and UL-MAP 624 provide sub-channel allocation and other control information for DL subframe 606 and UL subframe 608, respectively. Thereby, each one of secondary user nodes 804 can ascertain which set of sub-carriers and symbol number 604 will be idle or unassigned during a given OFDM/OFDMA frame, such as broadcast frame 600. If one of secondary nodes 804 has no data to transmit, that secondary node 804 listens for data symbols transmitted by neighboring secondary nodes 804 on idle sub-carriers during the idle symbol periods (e.g., idle blocks 612, 614 and 616). On the other hand, if one of secondary nodes 804 has data to transmit, that secondary node 804 transmits data transmitted to neighboring secondary nodes 804 on idle sub-carriers during the idle symbol periods for the down-link as illustrated by FIG. 8A. Transmission by the ad-hoc or secondary node 804 within up-link idle spectrum is similarly accomplished.

In one embodiment of the present disclosure, the secondary node 804 starts transmission after the passage of a guard time ($T_g$), such as in the ALOHA scheme. In another embodiment of the present disclosure, the transmitting node determines if another secondary node 804 is already transmitting in unassigned sub-carriers in symbol number 604 by conventional carrier sense multiple access (CSMA) techniques.

As shown in FIGS. 8A and 8B, two secondary nodes 804 may transmit simultaneously in the same symbol number 604 in different sub-carriers. If unassigned sub-carriers are found to be in use by other secondary nodes 804, other secondary nodes 804 waits for the next idle block (e.g., idle block 612, 614 or 616) and repeats the access process.

In one embodiment according to the present disclosure, the battery life for battery-powered secondary nodes 804 may be extended. For example, secondary nodes 804 can power-down the transmitter circuitry when there is no data to transmit. Furthermore, secondary nodes 804 can power-down the receiver circuitry and other non-essential circuits during symbol number 604 when there are no idle sub-carriers. Secondary node 804 powers up at the appropriate time to receive the OFDM frame, DL-MAP and UL-MAP.

Figure 9:
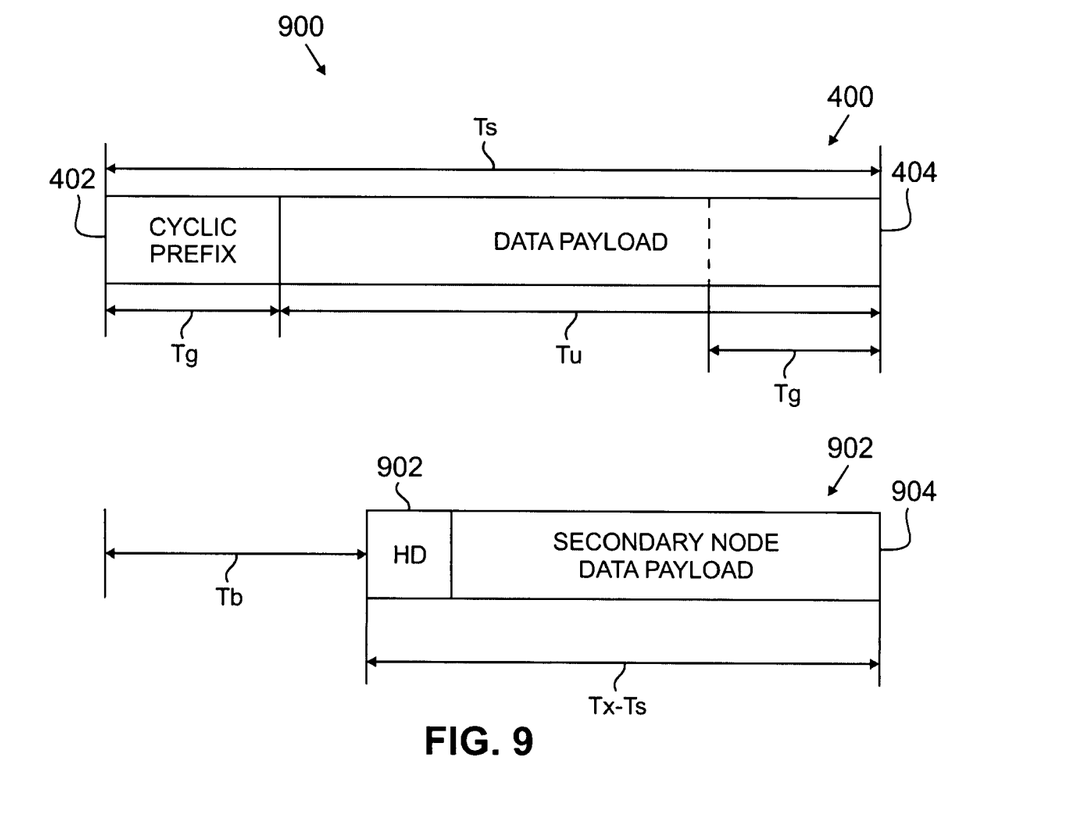
FIG. 9 depicts an exemplary OFDM symbol data payload relative to a secondary node data payload for a given OFDM symbol period according to one embodiment of the present disclosure.

FIG. 9 illustrates the relative relationship 900 between the symbol periods of OFDM symbol 400 (which as described earlier in conjunction with the description accompanying FIG. 4) and the symbol period or length ($T_x$) 902 of secondary node data burst 802. Symbol period 902 is preferably kept less than or equal to in time duration of OFDM symbol period ($T_s$). The header (HD) and secondary node data burst or payload 904 may use a variable length symbol format. However, a shorter symbol period ($T_x$) implies a greater subcarrier spacing if the secondary node modulation is based on OFDM as well. Thus, as seen in FIG. 9, the symbol period ($T_x$) for symbol 902 is generally about "$T_b$" less than the same for OFDM symbol 400.

Figure 10:
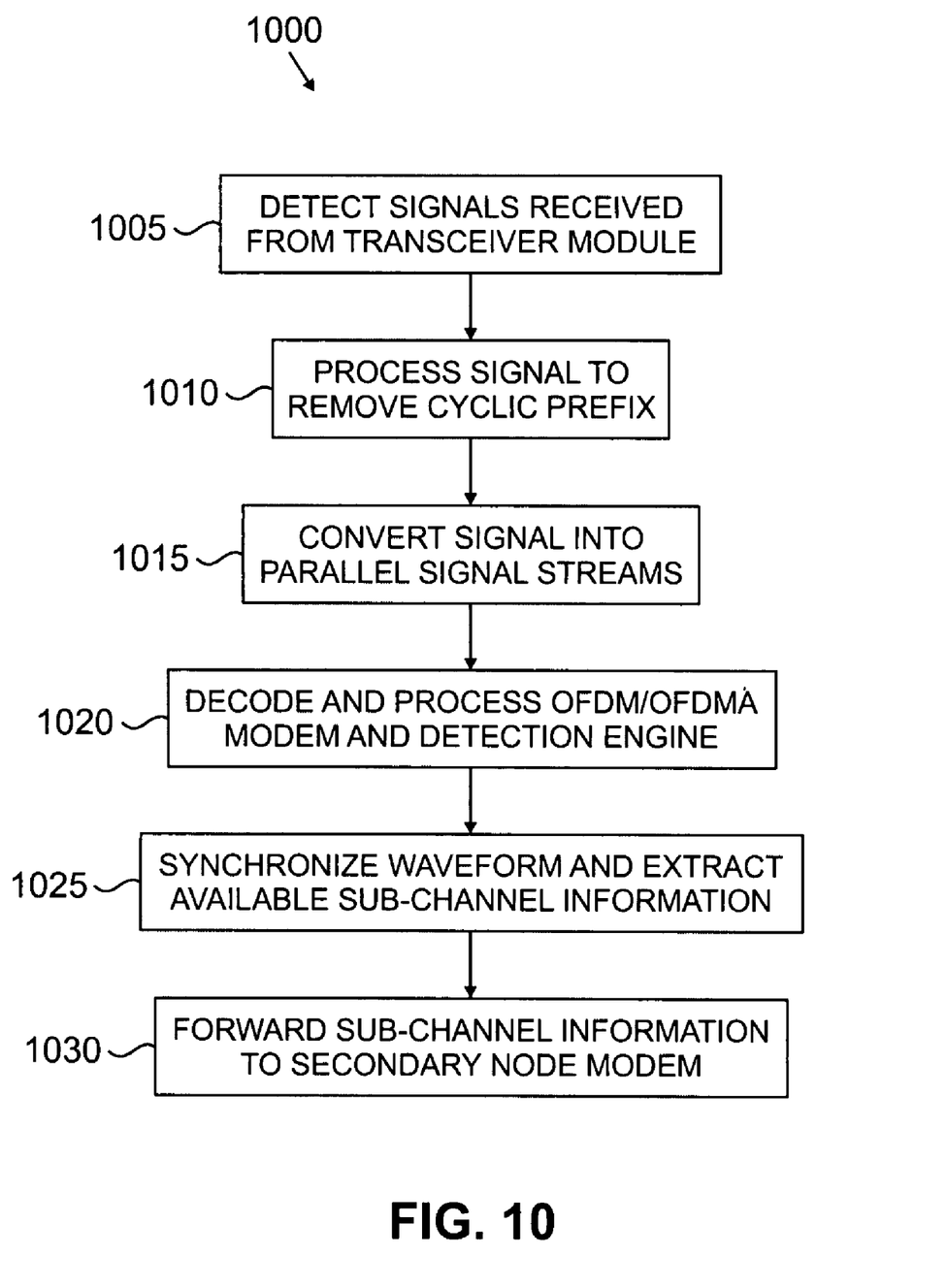
FIG. 10 is a somewhat simplified flow diagram illustrating an exemplary method of spectrum sharing in a wireless communication network according to one embodiment of the present disclosure.

FIG. 10 is a somewhat simplified flow diagram of method 100 for spectrum sharing in WiMAX networks according to one embodiment of the present disclosure. In step 1005, an OFDM/OFDMA frame detector detects signals received from a transceiver module, such as transceiver 706.

In step 1010, the signal is passed to a synchronizer, such as synchronizer module 710, where the CP is removed and the signal is synchronized with an OFDM/OFDMA frame such as, for example, frame structure 600b according to one embodiment of the present disclosure. The signal is also separated into parallel data streams (e.g., $X_0 \ldots X_{N-1}$). A MAP within synchronizer 710 maps each data stream into I and Q modulation symbols.

In step 1015, the signal is then passed to an FFT block, such as FFT block 712. In step 1020, the data streams are passed to parallel-to-serial converter, such as parallel-to-serial block 714. The signal is demodulated in a demodulator, such as demodulator 716, and then output to a decoder, such as decoder block 718.

In step 1025, a processing module, such as MAC processing block 720, and an SU MAP detector, such as SU MAP detector 736, detects the decoded signal and extracts the SU sub-channel information for that frame from an SU MAP, such as SU MAP 636. In step 1030, MAC processing block 720 then outputs the signal and SU sub-channel information to a node modem, such as node modem 738.

Accordingly, method 1000 provides secondary users with dynamic access to channel availability through the use of an SU MAP detector 736 and SU MAP 636 in broadcast wireless waveforms such as, for example, in IEEE-802.16 or WiMAX, in a non-interfering or leasing basis.

In describing method 1000 and system 700, "secondary users" generally refers to spectrum users who are not owners of the spectrum but who operate in the spectrum based on agreements/etiquettes imposed by the primary users or regulatory entities. For example, using method 1000, secondary users of system 700 dynamically form ad-hoc mesh network communications in fixed or mobile scenarios. In other words, secondary users refer to spectrum users who are not owners of the spectrum but who operate in the spectrum based on agreements/etiquettes imposed by the primary users or regulatory entities. For example, secondary users of method 1000 may dynamically form ad-hoc mesh network communications in fixed or mobile scenarios.

Although the present disclosure has been described with an exemplary embodiment, various changes and modifications may be suggested to one skilled in the art. For example, the present disclosure primarily describes spectrum sharing in a WiMAX communication network, it should be understood, however, that embodiments of the present disclosure may be used in any suitable wireless communication system.

It is intended that the present disclosure encompass such changes and modifications as fall within the scope of the appended claims.

What is claimed is:

1. A spectrum sharing system for use in a wireless communication system having a primary user node and a secondary user node, the system comprising:
   a frame detector in a processing block of the secondary user node configured to detect a frame of the broadcast waveform, wherein the frame comprises transmitted data; and
   a secondary user map (SU MAP) detector configured to detect an SU MAP from the frame and to extract subframe information identifying usable sub-carriers for the frame to a media access control (MAC) processing block of the secondary user node,
   wherein the secondary user node transmits data in a first one of usable sub-carriers identified in the subframe information, wherein the subframe information is stored in the secondary user map.

2. The system set forth in claim 1, wherein the frame detector is one of: an OFDM frame detector and an OFDMA frame detector.

3. The system set forth in claim 1, wherein the broadcast waveform is one of: an OFDM waveform and an OFDMA waveform.

4. The system set forth in claim 1, wherein the secondary user node comprises a node modem.

5. The system set forth in claim 4, wherein the node modem is a MANET node modem.

6. The system set forth in claim 4, wherein the node modem and the frame detector are synchronized.

7. The system set forth in claim 1, wherein the secondary user node extracts usable pilot sub-carriers for the frame.

8. The system set forth in claim 1, wherein a second secondary user node transmits data in a second usable sub-carrier identified in the subframe information.

9. The system set forth in claim 1, wherein the wireless communication system is a WiMAX communication system.

10. For use in a wireless communication network having a primary user node and a secondary user node, a method of spectrum sharing, the method comprising:
    detecting a frame of a broadcast waveform at a frame detector in a processing block of the secondary user node, wherein the frame comprises transmitted data;
    extracting subframe information identifying usable sub-carriers for the frame to a media access control (MAC) processing block of the secondary user node, wherein the subframe information is stored in a secondary user map in the frame; and
    transmitting data from the secondary user node in a first sub-carrier identified in the subframe information.

11. The method set forth in claim 10, wherein the frame detector is one of: an OFDM frame detector and an OFDMA frame detector.

12. The method set forth in claim 10, wherein the broadcast waveform is one of: an OFDM waveform and an OFDMA waveform.

13. The method set forth in claim 10, wherein the secondary user node comprises a node modem.

14. The method set forth in claim 12, wherein the node modem is a MANET node modem.

15. The method set forth in claim 12 further comprising: synchronizing the node modem and the frame detector.

16. The method set forth in claim 10 further comprising: extracting usable pilot sub-carriers for the frame.

17. The method set forth in claim 10 further comprising: transmitting data from a second secondary user node into a second sub-carrier identified in the subframe information.

18. The method set forth in claim 10 further comprising: dynamically forming an ad hoc mesh network with the secondary user node.

19. The method set forth in claim 10, wherein the wireless communication network is a WiMAX communication network.

20. For use in a wireless communication system, an apparatus for forming an ad hoc mesh network, the apparatus comprising:
    a secondary user node having a node modem; and
    a frame detector in a processing block of the secondary user node configured to detect a frame of a broadcast waveform, wherein the frame comprises transmitted data; and
    a secondary user map (SU MAP) detector configured to detect an SU MAP from the frame and to extract subframe information for the frame to a media access control (MAC) processing block of the secondary user node, wherein the secondary user node transmits data in a first unused sub-carrier identified in the subframe information, wherein the subframe information is stored in the secondary user map.

21. The apparatus set forth in claim 20, wherein the node modem and the frame detector are synchronized.

22. The apparatus set forth in claim 20, wherein the secondary user node extracts usable pilot sub-carriers for the frame.

23. The apparatus set forth in claim 20, wherein wireless communication system is a WiMAX communication system.

* * * * *